United States Patent
Zhang et al.

(10) Patent No.: US 10,482,027 B2
(45) Date of Patent: Nov. 19, 2019

(54) CACHE MANAGEMENT METHOD AND APPARATUS

(71) Applicant: HUAWEI TECHNOLOGIES CO., LTD., Shenzhen, Guangdong (CN)

(72) Inventors: Xianfu Zhang, Shenzhen (CN); Qiang Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 90 days.

(21) Appl. No.: 15/391,112

(22) Filed: Dec. 27, 2016

(65) Prior Publication Data
US 2017/0192899 A1    Jul. 6, 2017

(30) Foreign Application Priority Data
Dec. 31, 2015    (CN) .......................... 2015 1 1032088

(51) Int. Cl.
*G06F 12/08* (2016.01)
*G06F 12/0893* (2016.01)
(Continued)

(52) U.S. Cl.
CPC ........ *G06F 12/0893* (2013.01); *G06F 9/5016* (2013.01); *G06F 12/084* (2013.01);
(Continued)

(58) Field of Classification Search
CPC ............... G06F 12/0893; G06F 12/084; G06F 12/0871; G06F 12/0895; G06F 39/5016
See application file for complete search history.

(56) References Cited

U.S. PATENT DOCUMENTS 4,851,993 A    7/1989   Chen et al.
5,715,430 A    2/1998   Hirayama
(Continued)

FOREIGN PATENT DOCUMENTS

CN    103257850 A    8/2013
GB    2216308        10/1989

OTHER PUBLICATIONS

European Office Action dated Jan. 23, 2018 in corresponding European Patent Application No. 16 207 047.8, 9 pgs.
(Continued)

*Primary Examiner* — Ryan Bertram
(74) *Attorney, Agent, or Firm* — Fish & Richardson P.C.

(57) ABSTRACT

This application relates to a cache management method and apparatus, so as to improve cache efficiency and reduce waste of cache resources. The cache management method provided in this application includes: after receiving a to-be-processed command, determining a quantity of cache units needed by the to-be-processed command; if the quantity of cache units needed by the to-be-processed command is one, searching for, based on a cache unit pair first state table, a pair of cache units in which only one cache unit is idle, and allocating the idle cache unit in the pair of cache units to the to-be-processed command; and if the quantity of cache units needed by the to-be-processed command is two, searching for and allocating, based on a cache unit pair second state table in a clock cycle, a pair of cache units in which two cache units are both idle to the to-be-processed command.

11 Claims, 11 Drawing Sheets

(51) Int. Cl.
*G06F 12/084* (2016.01)
*G06F 12/0871* (2016.01)
*G06F 9/50* (2006.01)
*G06F 12/0895* (2016.01)

(52) U.S. Cl.
CPC ...... *G06F 12/0871* (2013.01); *G06F 12/0895* (2013.01); *G06F 2212/60* (2013.01); *G06F 2212/62* (2013.01)

(56) References Cited

U.S. PATENT DOCUMENTS

| | | |
|---|---|---|
| 6,427,195 B1 | 7/2002 | McGowen et al. |
| 9,740,604 B2 * | 8/2017 | Kim ...................... G06F 12/023 |
| 2008/0104353 A1 * | 5/2008 | Madisetti .............. G06F 12/023 |
| | | 711/170 |
| 2015/0261683 A1 | 9/2015 | Hong et al. |
| 2016/0055082 A1 * | 2/2016 | Kim ...................... G06F 12/023 |
| | | 711/118 |

OTHER PUBLICATIONS

Chinese Office Action dated Feb. 12, 2018 in corresponding Chinese Patent Application No. 201511032088.6, 7 pgs.
Extended European Search Report, dated May 31, 2017, in European Application No. 16207047.8 (12 pp.).
*Buddy memory allocation,* Wikipedia entry, XP-55372202A, pp. 1-4.
Online CS Modules: Memory Allocation, XP 55372231A (1 pg.).

* cited by examiner

CACHE MANAGEMENT METHOD AND APPARATUS

CROSS-REFERENCE TO RELATED APPLICATION

This application claims priority to Chinese Patent Application No. 201511032088.6, filed on Dec. 31, 2015, which is hereby incorporated by reference in its entirety.

TECHNICAL FIELD

This application relates to the field of chip design, and in particular, to a cache management method and apparatus.

BACKGROUND

A dedicated command processing chip is used to process one or more commands predefined by a system. For example, a router is dedicated to processing data forwarding. As a scale of data processing chips becomes larger, there are more on-chip memories. To reduce a scale of memories, a shared cache is used in some places that do not need a full-thread cache so as to reduce memory resources. Therefore, design and management of the shared cache is especially important. To facilitate allocation and management of the cache, the shared cache is divided into multiple cache units with a same size, and the size of the cache units may be preset according to actual requirements of command processing.

A command processing procedure of a functional module responsible for command processing in a chip is generally: when the module receives a to-be-processed command from a programmable processor, parsing the command to confirm whether the command needs to cache data; if the command needs to cache data, allocating a cache unit to the to-be-processed command in a clock cycle, writing associated data that does not participate in data processing such as a thread identity (ID) of the to-be-processed command into the allocated cache unit, and performing command processing; in a command processing process, always storing the associated data in the cache unit; and after the command processing is completed, reading the associated data in the cache unit and releasing the cache unit.

To facilitate cache management, generally, cache units are of only one size. With diversification and complication of chip command processing, a problem that the size of the cache units is set unreasonably becomes prominent. If a cache unit with a small granularity is used, when a volume of data that the to-be-processed command needs to cache is relatively large, multiple clock cycles are needed for completing caching the data once. Consequently, cache efficiency is low. If a cache unit with a large granularity is used, when a volume of data that the to-be-processed command needs to cache is relatively small, waste of cache resources is caused.

It can be learned that how to both improve the cache efficiency and reduce the waste of the cache resources becomes a problem to be resolved urgently.

SUMMARY

Embodiments of this application provide a cache management method and apparatus, so as to improve cache efficiency and reduce waste of cache resources.

An embodiment of this application provides a cache management method, and the cache management method is applied to a shared cache management system, where the shared cache management system has N cache units with continuous addresses, and maintains a cache unit pair first state table and a cache unit pair second state table, and the shared cache management system divides the N continuous cache units into pairs in order, where the cache unit pair first state table is used to indicate whether only one cache unit in each pair of cache units is idle, and the cache unit pair second state table is used to indicate whether two cache units in each pair of cache units are both idle. The method includes: after receiving a to-be-processed command, determining a quantity of cache units needed by the to-be-processed command; if the quantity of cache units needed by the to-be-processed command is one, searching for, based on the cache unit pair first state table, a pair of cache units in which only one cache unit is idle, and allocating the idle cache unit in the pair of cache units to the to-be-processed command; and if the quantity of cache units needed by the to-be-processed command is two, searching for and allocating, based on the cache unit pair second state table in a clock cycle, a pair of cache units in which two cache units are both idle to the to-be-processed command.

In the foregoing step, if the quantity of cache units needed by the to-be-processed command is one, and a pair of cache units in which only one cache unit is idle are not found based on the cache unit pair first state table, the cache management method further includes: searching for, based on the cache unit pair second state table, a pair of cache units in which two cache units are both idle, and allocating either of the pair of cache units to the to-be-processed command.

The shared cache management system may further maintain an odd address state table and an even address state table, where the odd address state table is used to indicate an idle state of a cache unit with an odd address, and the even address state table is used to indicate an idle state of a cache unit with an even address.

In an implementation manner, the cache unit pair second state table is an AND table, where the AND table is a value obtained by performing an AND operation on a value corresponding to each pair of cache units in the odd address state table and a value corresponding to each pair of cache units in the even address state table; in the odd address state table and the even address state table, an idle state indicator bit with a value of 1 represents being idle, and an idle state indicator bit with a value of 0 represents being occupied; in the foregoing step, the searching for, based on the cache unit pair second state table, a pair of cache units in which two cache units are both idle includes: searching the AND table for an AND indicator bit with a value of 1, and determining that a pair of cache units indicated by the found AND indicator bit with a value of 1 are the found pair of cache units.

In another implementation manner, the cache unit pair second state table is an OR table, where the OR table is a value obtained by performing an OR operation on a value corresponding to each pair of cache units in the odd address state table and a value corresponding to each pair of cache units in the even address state table; in the odd address state table and the even address state table, an idle state indicator bit with a value of 1 represents being occupied, and an idle state indicator bit with a value of 0 represents being idle; in the foregoing step, the searching for, based on the cache unit pair second state table, a pair of cache units in which two cache units are both idle includes: searching the OR table for an OR indicator bit with a value of 0, and if the OR indicator bit with a value of 0 is found, determining that a pair of cache units indicated by the found OR indicator bit with a value of 0 are the found pair of cache units.

In an implementation manner, the cache unit pair first state table is an exclusive OR (XOR) table, where the XOR table is a value obtained by performing an XOR operation on a value corresponding to each pair of cache units in the odd address state table and a value corresponding to each pair of cache units in the even address state table; the searching for, based on the cache unit pair first state table, a pair of cache units in which only one cache unit is idle includes: searching the XOR table for an XOR indicator bit with a value of 1; and if the XOR indicator bit with a value of 1 is found, determining that a pair of cache units indicated by the found XOR indicator bit with a value of 1 are the found pair of cache units; in the foregoing step, the allocating the idle cache unit in the pair of cache units to the to-be-processed command includes: determining an idle cache unit in the pair of cache units according to the value corresponding to the found XOR indicator bit with a value of 1 in the odd address state table and the value corresponding to the found XOR indicator bit with a value of 1 in the even address state table, and allocating the determined idle cache unit to the to-be-processed command.

In the foregoing step, after the if the quantity of cache units needed by the to-be-processed command is two, allocating a pair of cache units to the to-be-processed command, the method further includes: after completing processing the to-be-processed command, recycling the pair of allocated cache units in a clock cycle.

Further, after recycling the pair of cache units in a clock cycle, the method further includes: determining, according to other bits except last bits in cache addresses corresponding to the pair of cache units, indicator bits corresponding to the pair of cache units in the odd address state table and the even address state table, and updating values of the determined indicator bits in the odd address state table and the even address state table.

An embodiment of this application provides a cache management apparatus, where the apparatus is applied to a shared cache management system and includes a determining module, a cache unit single allocation module and a cache unit pairing allocation module, where the shared cache management system has N cache units with continuous addresses, the shared cache management system maintains a cache unit pair first state table and a cache unit pair second state table, and the shared cache management system divides the N continuous cache units into pairs in order, where the cache unit pair first state table is used to indicate whether only one cache unit in each pair of cache units is idle, and the cache unit pair second state table is used to indicate whether two cache units in each pair of cache units are both idle;

the determining module is configured to: after receiving a to-be-processed command, determine a quantity of cache units needed by the to-be-processed command; and if the quantity of cache units needed by the to-be-processed command is one, instruct the cache unit single allocation module to perform cache allocation, and if the quantity of cache units needed by the to-be-processed command is two, instruct the cache unit pairing allocation module to perform cache allocation;

the cache unit single allocation module is configured to: search for, based on the cache unit pair first state table, a pair of cache units in which only one cache unit is idle, and allocate the idle cache unit in the pair of cache units to the to-be-processed command; and the cache unit pairing allocation module is configured to: search for and allocate, based on the cache unit pair second state table in a clock cycle, a pair of cache units in which two cache units are both idle to the to-be-processed command.

In this application, if the quantity of cache units needed by the to-be-processed command is one, and the cache unit single allocation module does not find a pair of cache units in which only one cache unit is idle, the cache unit single allocation module is further configured to: search for, by means of the cache unit pairing allocation module, a pair of cache units in which two cache units are both idle, and allocate either of the pair of cache units to the to-be-processed command.

The shared cache management system may further maintain an odd address state table and an even address state table, where the odd address state table is used to indicate an idle state of a cache unit with an odd address, and the even address state table is used to indicate an idle state of a cache unit with an even address.

In an implementation manner, the cache unit pair second state table is an AND table, where the AND table is a value obtained by performing an AND operation on a value corresponding to each pair of cache units in the odd address state table and a value corresponding to each pair of cache units in the even address state table; in the odd address state table and the even address state table, an idle state indicator bit with a value of 1 represents being idle, and an idle state indicator bit with a value of 0 represents being occupied; the cache unit pairing allocation module is specifically configured to: search the AND table for an AND indicator bit with a value of 1, and determine that a pair of cache units indicated by the found AND indicator bit with a value of 1 are the found pair of cache units in which two cache units are both idle.

In another implementation manner, the cache unit pair second state table is an OR table, where the OR table is a value obtained by performing an OR operation on a value corresponding to each pair of cache units in the odd address state table and a value corresponding to each pair of cache units in the even address state table; in the odd address state table and the even address state table, an idle state indicator bit with a value of 1 represents being occupied, and an idle state indicator bit with a value of 0 represents being idle; the cache unit pairing allocation module is specifically configured to: search the OR table for an OR indicator bit with a value of 0, and if the OR indicator bit with a value of 0 is found, determine that a pair of cache units indicated by the found OR indicator bit with a value of 0 are the found pair of cache units in which two cache units are both idle.

In an implementation manner, the cache unit pair first state table is an exclusive OR XOR table, where the XOR table is a value obtained by performing an XOR operation on a value corresponding to each pair of cache units in the odd address state table and a value corresponding to each pair of cache units in the even address state table; the cache unit single allocation module is specifically configured to: search the XOR table for an XOR indicator bit with a value of 1; and if the XOR indicator bit with a value of 1 is found, determine that a pair of cache units indicated by the found XOR indicator bit with a value of 1 are the found pair of cache units; and determine an idle cache unit in the pair of cache units according to the value corresponding to the found XOR indicator bit with a value of 1 in the odd address state table and the value corresponding to the found XOR indicator bit with a value of 1 in the even address state table, and allocate the determined idle cache unit to the to-be-processed command.

In this application, if the quantity of cache units needed by the to-be-processed command is two, the apparatus further includes: a recycling module, configured to: after completing processing the to-be-processed command, recycle, in a clock cycle, the pair of cache units allocated to the to-be-processed command.

Further, the recycling module is further configured to: after recycling the pair of cache units in a clock cycle, determine, according to other bits except last bits in cache addresses corresponding to the pair of cache units, indicator bits corresponding to the pair of cache units in the odd address state table and the even address state table, and update values of the determined indicator bits in the odd address state table and the even address state table.

An embodiment of this application further provides a command processing apparatus in a chip, including an input processing unit, a cache management unit, a command processing unit, an output processing unit, and a multithread sharing shared cache, and the shared cache is generally a Static Random Access Memory SRAM, where the shared cache has N cache units with continuous addresses, the cache management unit maintains a cache unit pair first state table and a cache unit pair second state table, and the cache management unit divides the N continuous cache units into pairs in order, where the cache unit pair first state table is used to indicate whether only one cache unit in each pair of cache units is idle, and the cache unit pair second state table is used to indicate whether two cache units in each pair of cache units are both idle;

the input processing unit is configured to: after receiving a to-be-processed command, parse the to-be-processed command, determine a quantity of cache units that need to be applied for, and send a cache application to the cache management unit; and according to addresses of cache units allocated by the cache management unit, save associated data (such as a thread ID) that does not participate in data processing in the to-be-processed command into the shared cache, and send the addresses of the allocated cache units to the command processing unit;

the cache management unit is configured to: if the quantity of cache units applied for by the input processing unit is one, search for, based on the cache unit pair first state table, a pair of cache units in which only one cache unit is idle, and transmit the idle cache unit in the pair of cache units to the input processing unit; and if the quantity of cache units needed by the to-be-processed command is two, search for, based on the cache unit pair second state table, a pair of cache units in which two cache units are both idle for the to-be-processed command, and transmit the pair of cache units to the input processing unit in a clock cycle; and after receiving cache addresses of two continuous cache units transmitted by the output processing unit, recycle the cache addresses in a clock cycle;

the command processing unit is configured to process the command (such as addition, subtraction, multiplication, or division; in a command processing process, the associated data is always kept in the cache unit), and transmit a processing result and a cache address to the output processing unit after completing processing; and the output processing unit is configured to read the associated data in the shared cache according to the cache address transmitted by the command processing unit, output the associated data together with the processing result, and meanwhile, transmit the cache address to the cache management unit for cache recycling.

In this application, if the quantity of cache units needed by the to-be-processed command is one, and the cache management unit does not find, based on the cache unit pair first state table, a pair of cache units in which only one cache unit is idle, the cache management unit is further configured to: search for, based on the cache unit pair second state table, a pair of cache units in which two cache units are both idle, and allocate either of the pair of cache units to the to-be-processed command.

The cache management unit may further maintain an odd address state table and an even address state table, where the odd address state table is used to indicate an idle state of a cache unit with an odd address, and the even address state table is used to indicate an idle state of a cache unit with an even address.

In an implementation manner, the cache unit pair second state table is an AND table, where the AND table is a value obtained by performing an AND operation on a value corresponding to each pair of cache units in the odd address state table and a value corresponding to each pair of cache units in the even address state table; in the odd address state table and the even address state table, an idle state indicator bit with a value of 1 represents being idle, and an idle state indicator bit with a value of 0 represents being occupied; the cache management unit is specifically configured to search for, according to the following steps, a pair of cache units in which two cache units are both idle: searching the AND table for an AND indicator bit with a value of 1, and determining that a pair of cache units indicated by the found AND indicator bit with a value of 1 are the found pair of cache units in which two cache units are both idle.

In another implementation manner, the cache unit pair second state table is an OR table, where the OR table is a value obtained by performing an OR operation on a value corresponding to each pair of cache units in the odd address state table and a value corresponding to each pair of cache units in the even address state table; in the odd address state table and the even address state table, an idle state indicator bit with a value of 1 represents being occupied, and an idle state indicator bit with a value of 0 represents being idle; the cache management unit is specifically configured to search for, according to the following steps, a pair of cache units in which two cache units are both idle: searching the OR table for an OR indicator bit with a value of 0, and if the OR indicator bit with a value of 0 is found, determining that a pair of cache units indicated by the found OR indicator bit with a value of 0 are the found pair of cache units in which two cache units are both idle.

In an implementation manner, the cache unit pair first state table is an exclusive OR XOR table, where the XOR table is a value obtained by performing an XOR operation on a value corresponding to each pair of cache units in the odd address state table and a value corresponding to each pair of cache units in the even address state table; the cache management unit is specifically configured to: search the XOR table for an XOR indicator bit with a value of 1; and if the XOR indicator bit with a value of 1 is found, determine that a pair of cache units indicated by the found XOR indicator bit with a value of 1 are the found pair of cache units; and determine an idle cache unit in the pair of cache units according to the value corresponding to the found XOR indicator bit with a value of 1 in the odd address state table and the value corresponding to the found XOR indicator bit with a value of 1 in the even address state table, and allocate the determined idle cache unit to the to-be-processed command.

In this application, if the quantity of cache units needed by the to-be-processed command is two, after the command processing unit completes processing the to-be-processed command, the pair of cache units are recycled in a clock cycle.

Further, the cache management unit is further configured to: after recycling the pair of cache units in a clock cycle, determine, according to other bits except last bits in cache addresses corresponding to the pair of cache units, indicator bits corresponding to the pair of cache units in the odd address state table and the even address state table, and update values of the determined indicator bits in the odd address state table and the even address state table.

In this application, a cache unit pair first state table is used to indicate whether only one cache unit in each pair of cache units (addresses of each pair of cache units are continuous) is idle, and a cache unit pair second state table is used to indicate whether two cache units in each pair of cache units are both idle. If the quantity of cache units needed by the to-be-processed command is one, a pair of cache units in which only one cache unit is idle are searched for based on the cache unit pair first state table; if the quantity of cache units needed by the to-be-processed command is two, a pair of cache units in which two cache units are both idle are searched for based on the cache unit pair second state table. In this way, two continuous cache units may be allocated to the to-be-processed command in a clock cycle. For a to-be-processed command occupying a relatively large data bit width, cache allocation does not need to be performed by using multiple clock cycles, thereby improving cache allocation efficiency. On the other hand, for a to-be-processed command occupying a relatively small data bit width, only one cache unit may be allocated to the to-be-processed command, thereby reducing waste of cache resources.

DESCRIPTION OF EMBODIMENTS

In this application, a cache unit pair first state table is used to indicate whether only one cache unit in each pair of cache units (addresses of each pair of cache units are continuous) is idle, and a cache unit pair second state table is used to indicate whether two cache units in each pair of cache units are both idle. If the quantity of cache units needed by the to-be-processed command is one, a single idle cache unit is searched for and allocated based on the cache unit pair first state table; if the quantity of cache units needed by the to-be-processed command is two, two continuous idle cache units are searched for and allocated based on the cache unit pair second state table. By using solutions of this application, on one hand, for a to-be-processed command occupying a relatively large data bit width, cache allocation does not need to be performed by using multiple clock cycles, thereby improving cache allocation efficiency. On the other hand, for a to-be-processed command occupying a relatively small data bit width, only one cache unit may be allocated to the to-be-processed command, thereby reducing waste of cache resources.

The following further describes this application in detail with reference to accompanying drawings in this specification.

An embodiment of this application is applied to a shared cache management system, and the shared cache management system may be configured to manage a multithread shared cache in a chip, where the chip is configured to process at least one predefined command. The shared cache management system in this embodiment of this application has N cache units with continuous addresses, the shared cache management system maintains a cache unit pair first state table and a cache unit pair second state table, and the shared cache management system divides the N continuous cache units into pairs in order, where the cache unit pair first state table is used to indicate whether only one cache unit in each pair of cache units is idle, and the cache unit pair second state table is used to indicate whether two cache units in each pair of cache units are both idle. In addition, the shared cache management system may further maintain an odd address state table and an even address state table, where the odd address state table is used to indicate an idle state of a cache unit with an odd address, and the even address state table is used to indicate an idle state of a cache unit with an even address. The cache unit pair first state table and the cache unit pair second state table may be obtained based on the odd address state table and the even address state table.

Figure 1:
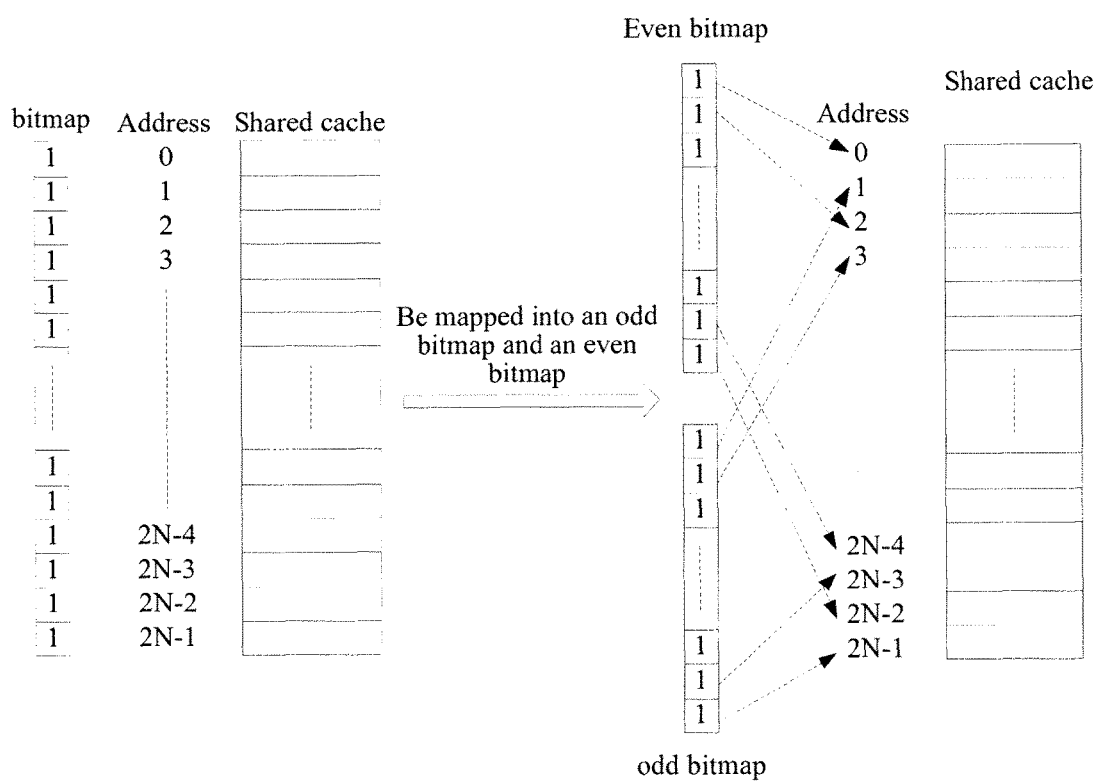
FIG. 1 is a schematic diagram of an even bitmap and an odd bitmap according to this application.

As shown in FIG. 1, in this embodiment, cache units in a shared cache are divided into an odd address cache unit (1, 3, 2N−3, 2N−1) and an even address cache unit (0, 2, 2N−4, 2N−2, in this embodiment of this application, 0 is an even number) according to logical addresses of the cache units (as shown in FIG. 1, logical addresses corresponding to 2N cache units are respectively 0 to 2N−1). An odd address state table and an even address state table (the odd address state table and the even address state table may specifically be embodied in forms of bitmaps, and are briefly called an odd bitmap and an even bitmap) are respectively used to indicate idle states of an odd address cache unit and an even address cache unit. In specific implementation, an idle state indicator bit with a value of 1 may represent being idle, and an idle state indicator bit with a value of 0 may represent being occupied; or, an idle state indicator bit with a value of 0 may represent being idle, and an idle state indicator bit with a value of 1 may represent being occupied.

Using an example in which an idle state indicator bit with a value of 1 represents being idle and an idle state indicator bit with a value of 0 represents being occupied, as shown in the following table 1, based on the odd bitmap and the even bitmap, the cache unit pair first state table and the cache unit pair second state table may be obtained. The cache unit pair first state table indicates whether only one cache unit in each pair of cache units is idle (1 represents yes, and 0 represents no), and the cache unit pair second state table indicates whether two cache units in each pair of cache units are both idle (1 represents yes, and 0 represents no). In specific implementation, the cache unit pair first state table may specifically be obtained by performing an exclusive OR (XOR) operation on the odd bitmap and the even bitmap, and the cache unit pair second state table may specifically be obtained by performing an AND operation on the odd bitmap and the even bitmap.

TABLE 1

| Even bitmap | Odd bitmap | XOR | AND | Cache unit occupied state |
|---|---|---|---|---|
| 0 | 0 | 0 | 0 | Paired occupation |
| 0 | 1 | 1 | 0 | Even occupied, Odd idle |
| 1 | 0 | 1 | 0 | Even idle, Odd occupied |
| 1 | 1 | 0 | 1 | Paired idle |

As shown in table 1, if a value of an XOR indicator bit is 1, it indicates that a value of an idle state indicator bit in the odd bitmap corresponding to the XOR indicator bit or a value of an idle state indicator bit in the even bitmap corresponding to the XOR indicator bit is 1, and the other is 0; that is, one of the odd address cache unit and the even address cache unit that correspond to the XOR indicator bit is in an idle state, and the other one is in an occupied state. Correspondingly, when the value of the XOR indicator bit is 0, it presents that both the value of the idle state indicator bit in the odd bitmap corresponding to the XOR indicator bit and the value of the idle state indicator bit in the even bitmap corresponding to the XOR indicator bit are 0 or 1; that is, both the odd address cache unit and the even address cache unit that correspond to the XOR indicator bit are in an idle state or in an occupied state.

When a value of an AND indicator bit is 0, it indicates that at least one of the value of the idle state indicator bit in the odd bitmap corresponding to the AND indicator bit and the value of the idle state indicator bit in the even bitmap corresponding to the AND indicator bit is 0; if 0 represents being occupied, at least one of the odd address cache unit and the even address cache unit is in an occupied state. Correspondingly, when the value of the AND indicator bit is 1, it indicates that both the value of the idle state indicator bit in the odd bitmap corresponding to the AND indicator bit and the value of the idle state indicator bit in the even bitmap corresponding to the AND indicator bit are 1; if 1 represents being idle, both the odd address cache unit and the even address cache unit are in an idle state.

It can be learned that when the idle state indicator bit with a value of 1 represents being idle and the idle state indicator bit with a value of 0 represents being occupied, an XOR indication signal may be used to indicate existence of a single idle cache unit in two continuous cache units, and an AND indication signal may be used to indicate existence of continuous idle cache units.

Correspondingly, if an idle state indicator bit with a value of 0 represents being idle and an idle state indicator bit with a value of 1 represents being occupied, an XOR indication signal may still be used to indicate existence of a single idle cache unit in two continuous cache units. Differently, an OR indication signal needs to be used to indicate existence of continuous idle cache units. As shown in the following table 2, when a value of an OR indicator bit is 0, it indicates that both the value of the idle state indicator bit in the odd bitmap corresponding to the OR indicator bit and the value of the idle state indicator bit in the even bitmap corresponding to the OR indicator bit are 0; that is, it indicates that both the odd address cache unit and the even address cache unit that correspond to the OR indicator bit are in an idle state. When a value of an OR indicator bit is 1, it indicates that at least one of the value of the idle state indicator bit in the odd bitmap corresponding to the OR indicator bit and the value of the idle state indicator bit in the even bitmap corresponding to the OR indicator bit is 1; that is, it indicates that at least one of the odd address cache unit and the even address cache unit that correspond to the OR indicator bit is in an occupied state.

TABLE 2

| Even bitmap | Odd bitmap | XOR | OR | Cache unit occupied state |
|---|---|---|---|---|
| 1 | 1 | 0 | 1 | Paired occupation |
| 1 | 0 | 1 | 1 | Even occupied, Odd idle |
| 0 | 1 | 1 | 1 | Even idle, Odd occupied |
| 0 | 0 | 0 | 0 | Paired idle |

Figure 2:
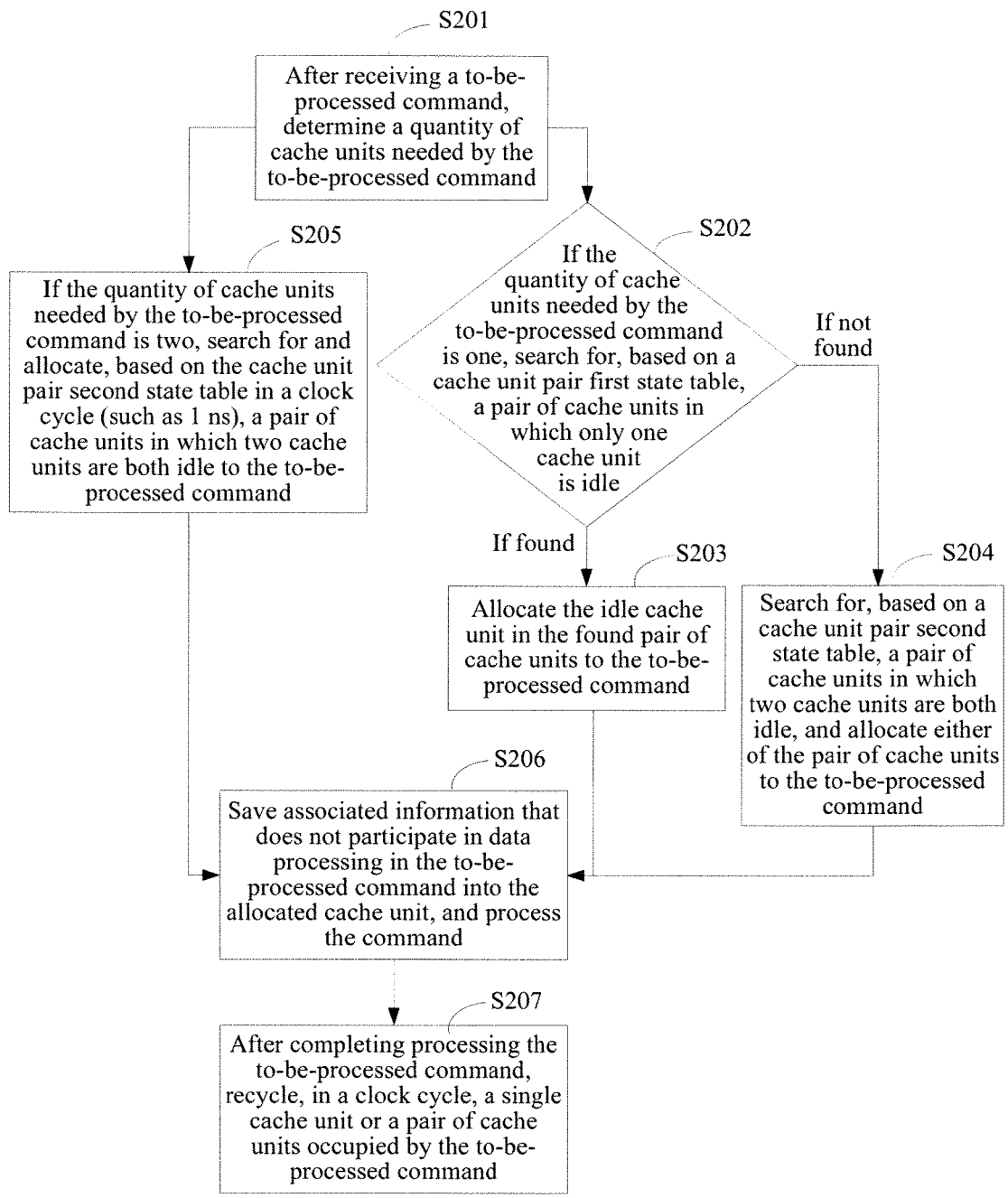
FIG. 2 is a flowchart of a cache management method according to Embodiment 1 of this application.

As shown in FIG. 2, with reference to the foregoing content, Embodiment 1 of this application provides a cache management method, and the method includes the following steps.

S201: After receiving a to-be-processed command, determine a quantity of cache units needed by the to-be-processed command.

In this step, after the to-be-processed command is received, the quantity of cache units needed by the command is determined according to an amount of data that needs to be cached by the command and a size of each cache unit. Here, the size of each cache unit may be set to be greater than a minimum size of a shared cache needed by at least one predefined command in a chip and to be less than a maximum size of the shared cache needed by the at least one predefined command.

S202: If the quantity of cache units needed by the to-be-processed command is one, search for, based on a cache unit pair first state table, a pair of cache units in which only one cache unit is idle; and if the pair of cache units in which only one cache unit is idle are found, go to S203; otherwise, go to S204.

Here, for a to-be-processed command applying for a cache unit, scattered single idle cache units in the shared cache are preferably searched for, so as to reserve more selectable resources for the to-be-processed command applying for two continuous cache units. In this embodiment of this application, because the cache unit pair first state table indicates whether only one cache unit in each pair of cache units is idle, it can be quickly determined, by searching the table, whether there is a pair of cache units in which only one cache unit is idle.

S203: Allocate the idle cache unit in the found pair of cache units to the to-be-processed command.

In this step, after the pair of cache units in which only one cache unit is idle are found, the idle cache unit in the pair of cache units may be determined according to values that correspond to the pair of cache units and that are in an odd address state table and an even address state table, and the determined idle cache unit is allocated to the to-be-processed command.

S204: Search for, based on a cache unit pair second state table, a pair of cache units in which two cache units are both idle, and allocate either of the pair of cache units to the to-be-processed command.

Here, if a single idle cache unit does not exist, only one idle cache unit may be selected from two continuous idle cache units and allocated to the to-be-processed command. Because the cache unit pair second state table indicates whether two cache units in each pair of cache units are both idle, a pair of cache units in which two cache units are both idle may be quickly found by searching the table.

S205: If the quantity of cache units needed by the to-be-processed command is two, search for and allocate, based on the cache unit pair second state table in a clock cycle (such as 1 ns), a pair of cache units in which two cache units are both idle to the to-be-processed command.

In this step, if the quantity of cache units needed by the to-be-processed command is two, two idle cache units are searched for and allocated to the to-be-processed command once based on the cache unit pair second state table in a clock cycle, so as to improve cache allocation efficiency. In addition, the allocated two cache units are continuous, thereby avoiding waste of register resources and logical resources caused by discontinuous cache addresses. Because the cache addresses are transmitted together with commands, if the cache addresses are discontinuous, multiple cache addresses need to be transmitted, thereby wasting register resources. Meanwhile, if the cache addresses are discontinuous, when data is read and written, multiple sets of read-write logic are needed and logical resources are wasted.

S206: Save associated data that does not participate in data processing in the to-be-processed command into the allocated cache unit, and process the command.

S207: After completing processing the to-be-processed command, recycle, in a clock cycle, a single cache unit or a pair of cache units occupied by the to-be-processed command.

Here, when cache recycling is performed, recycling of the single cache unit or two continuous cache units occupied by the to-be-processed command is completed in a clock cycle.

The following further describes the cache management method of this application by means of Embodiment 2 and Embodiment 3. Embodiment 2 is described by using an example in which an idle state indicator bit with a value of 1 represents being idle and an idle state indicator bit with a value of 0 represents being occupied, and in Embodiment 2, an exclusive OR (XOR) table and an AND table are used to search for a cache unit. Embodiment 3 is described by using an example in which an idle state indicator bit with a value of 0 represents being idle and an idle state indicator bit with a value of 1 represents being occupied, and in Embodiment 2, an exclusive OR (XOR) table and an OR table are used to search for a cache unit.

Embodiment 2

Figure 3:
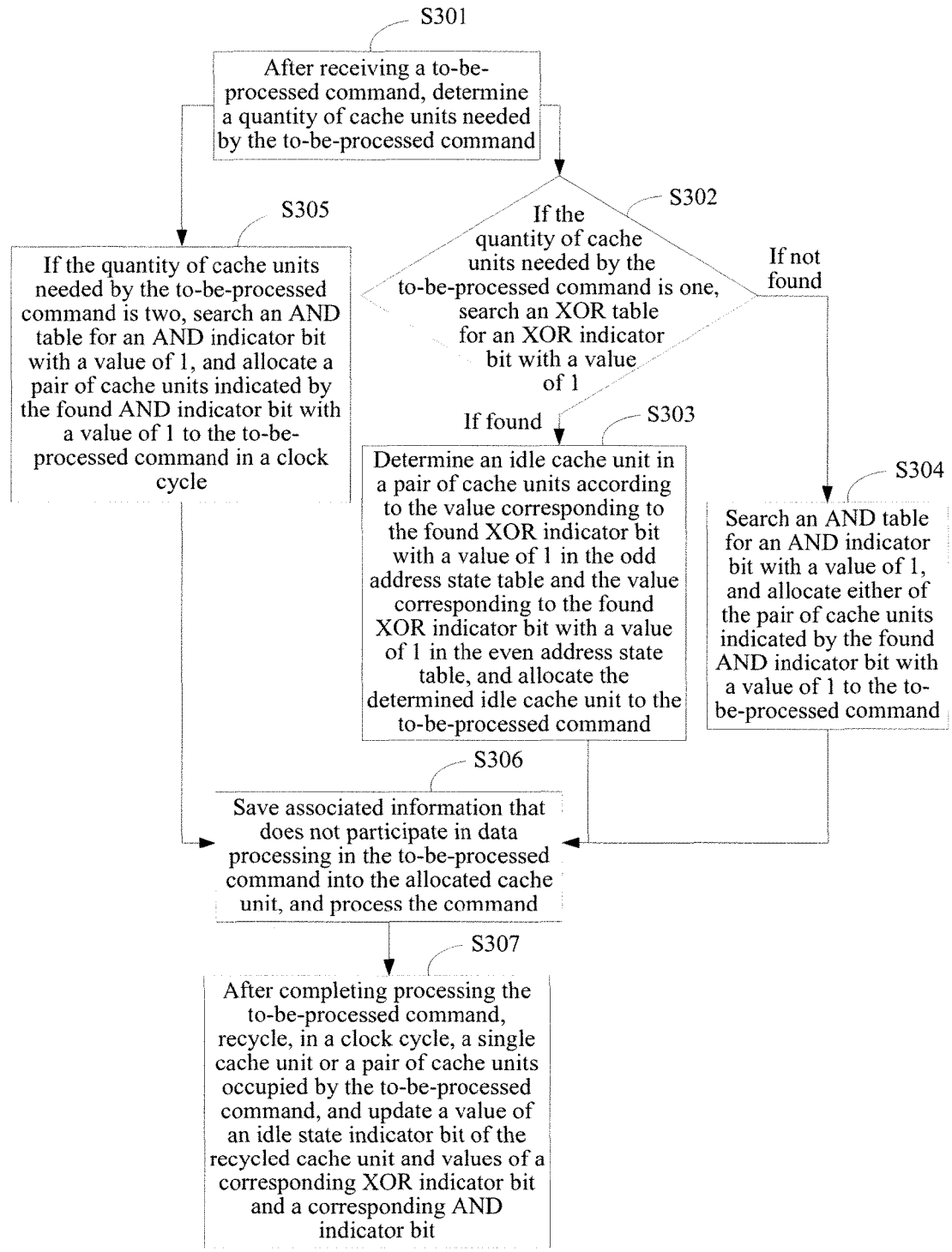
FIG. 3 is a flowchart of a cache management method according to Embodiment 2 of this application.

As shown in FIG. 3, Embodiment 2 of this application provides a cache management method. In this embodiment, an idle state indicator bit with a value of 1 represents being idle and an idle state indicator bit with a value of 0 represents being occupied. The method includes the following steps.

S301: After receiving a to-be-processed command, determine a quantity of cache units needed by the to-be-processed command.

S302: If the quantity of cache units needed by the to-be-processed command is one, search an XOR table for an XOR indicator bit with a value of 1, and if the XOR indicator bit with a value of 1 is found, go to S303; otherwise, go to S304.

S303: Determine an idle cache unit in a pair of cache units according to the value corresponding to the found XOR indicator bit with a value of 1 in the odd address state table and the value corresponding to the found XOR indicator bit with a value of 1 in the even address state table, and allocate the determined idle cache unit to the to-be-processed command.

Figure 4A:
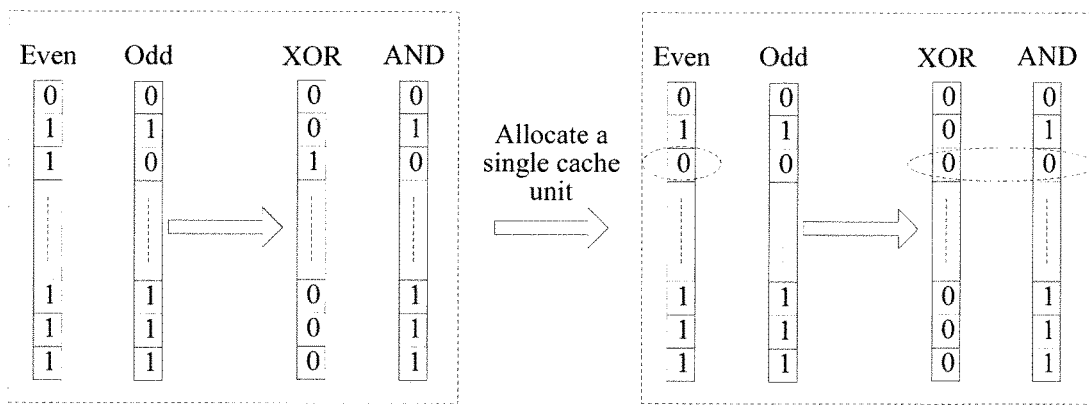
FIG. 4(a) is a schematic diagram of allocating a single idle cache unit according to Embodiment 2.

As shown in FIG. 4(a), an even address cache unit in a third pair of cache units from a start address of a shared cache is allocated to the to-be-processed command, the value of the corresponding XOR indicator bit is updated to 0, and a value of a corresponding AND indicator bit is still 0.

S304: Search an AND table for an AND indicator bit with a value of 1, and allocate either of the pair of cache units indicated by the found AND indicator bit with a value of 1 to the to-be-processed command.

Figure 4B:
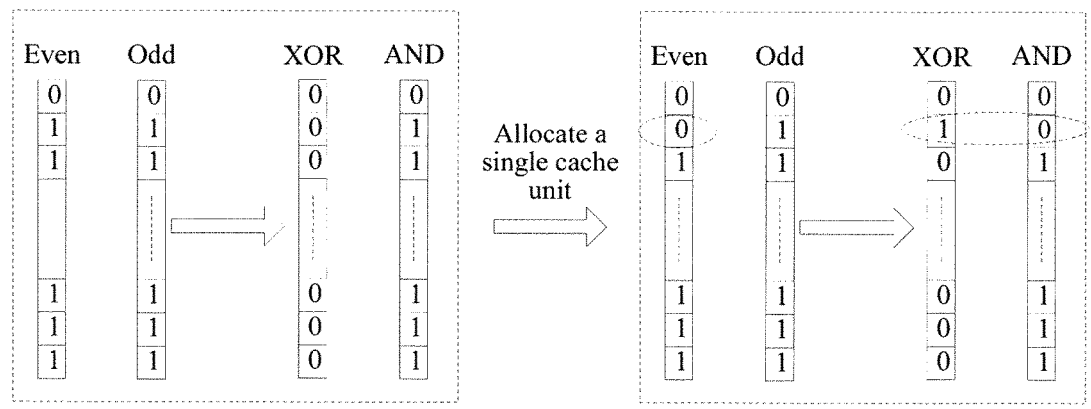
FIG. 4(b) is another schematic diagram of allocating a single idle cache unit according to Embodiment 2.

As shown in FIG. 4(b), an even address cache unit in a second pair of idle cache units from the start address of the shared cache is allocated to the to-be-processed command, the value of the corresponding XOR indicator bit is updated to 1, and the value of the corresponding AND indicator bit is updated to 0.

S305: If the quantity of cache units needed by the to-be-processed command is two, search an AND table for an AND indicator bit with a value of 1, and allocate a pair of cache units indicated by the found AND indicator bit with a value of 1 to the to-be-processed command in a clock cycle.

Figure 5:
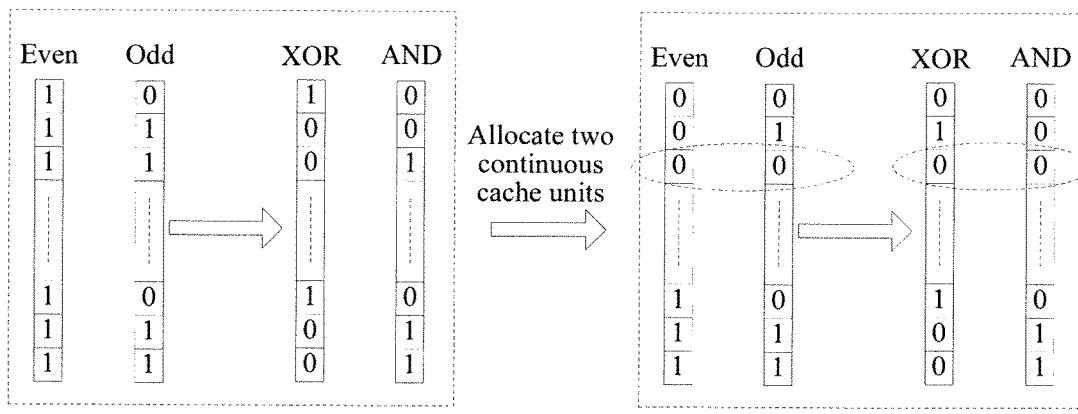
FIG. 5 is a schematic diagram of allocating two continuous idle cache units according to Embodiment 2.

As shown in FIG. 5, two continuous idle cache units indicated by a third pair of odd and even cache units from the start address of the shared cache are directly allocated to the to-be-processed command, the value of the corresponding AND indicator bit is updated to 0, and the value of the corresponding XOR indicator bit is still 0.

S306: Save associated data that does not participate in data processing in the to-be-processed command into the allocated cache unit, and process the command.

S307: After completing processing the to-be-processed command, recycle, in a clock cycle, a single cache unit or a pair of cache units occupied by the to-be-processed command, and update a value of an idle state indicator bit of the recycled cache unit and values of a corresponding XOR indicator bit and a corresponding AND indicator bit.

Here, if the cache unit previously allocated to the to-be-processed command is a single cache unit, the single cache unit is recycled during recycling. If the cache units previously allocated to the to-be-processed command are two continuous cache units, the two continuous cache units are recycled once during recycling, and the value of the idle state indicator bit of the corresponding recycled cache unit in a bitmap is set to 1.

Figure 6:
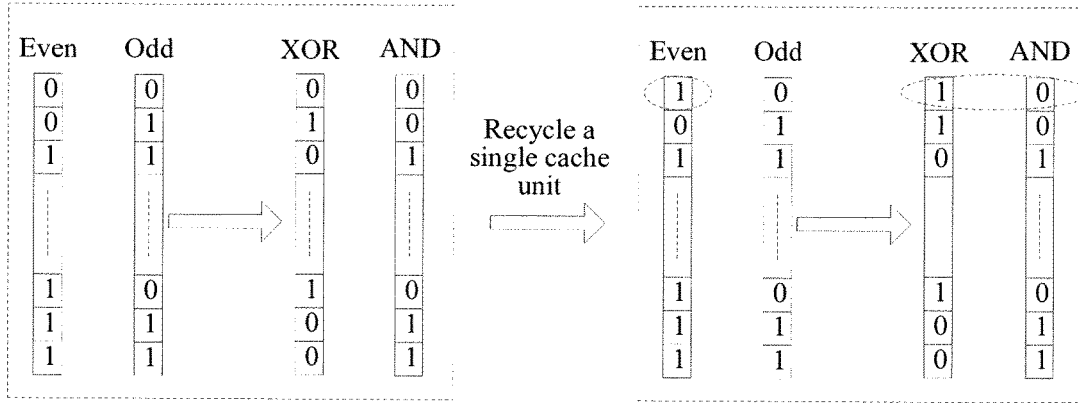
FIG. 6 is a schematic diagram of recycling a single idle cache unit according to Embodiment 2.

As shown in FIG. 6, a first cache unit of the shared cache is recycled. A value of an idle state indicator bit corresponding to the cache unit in the bitmap is set to 1, a value of a corresponding XOR indicator bit is set to 1, and a value of a corresponding AND indicator bit is unchanged.

Figure 7:
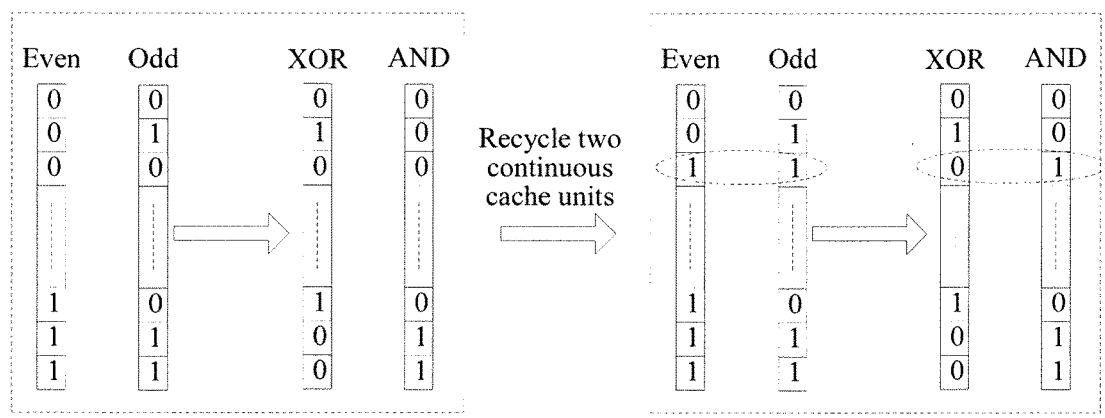
FIG. 7 is a schematic diagram of recycling two continuous cache units according to Embodiment 2.

As shown in FIG. 7, a third pair of cache units of the shared cache are recycled. A value of an idle state indicator bit corresponding to the pair of cache units in the bitmap is set to 1, a value of a corresponding AND indicator bit is set to 1, and a value of a corresponding XOR indicator bit is unchanged.

In a specific implementation process, when a single cache unit is recycled, all bits of an address of the cache unit need to be checked before an idle state indicator bit in the bitmap corresponding to the address of the cache unit can be confirmed. When two continuous cache units, that is, a pair of cache units, are recycled, because last bits of cache addresses of the pair of cache units are respectively 0 and 1, attention does not need to be paid to the last bits. That is, in specific implementation, indicator bits corresponding to the pair of cache units in the odd address state table and the even address state table are determined according to other bits except the last bits in the cache addresses corresponding to the pair of cache units, values of the determined indicator bits in the odd address state table and the even address state table are updated, and values of AND indicator bits corresponding to the pair of cache units are updated.

Embodiment 2 is described by using an example in which an idle state indicator bit with a value of 1 represents being idle and an idle state indicator bit with a value of 0 represents being occupied, an XOR indication signal is used to indicate existence of a single idle cache unit, and an AND indication signal is used to indicate existence of two continuous idle cache units. In another implementation manner, an idle state indicator bit with a value of 0 represents being idle and an idle state indicator bit with a value of 1 represents being occupied, an XOR indication signal is used to indicate existence of a single idle cache unit, and an OR indication signal is used to indicate existence of two continuous idle cache units. See description of Embodiment 3 for details.

Embodiment 3

Figure 8:
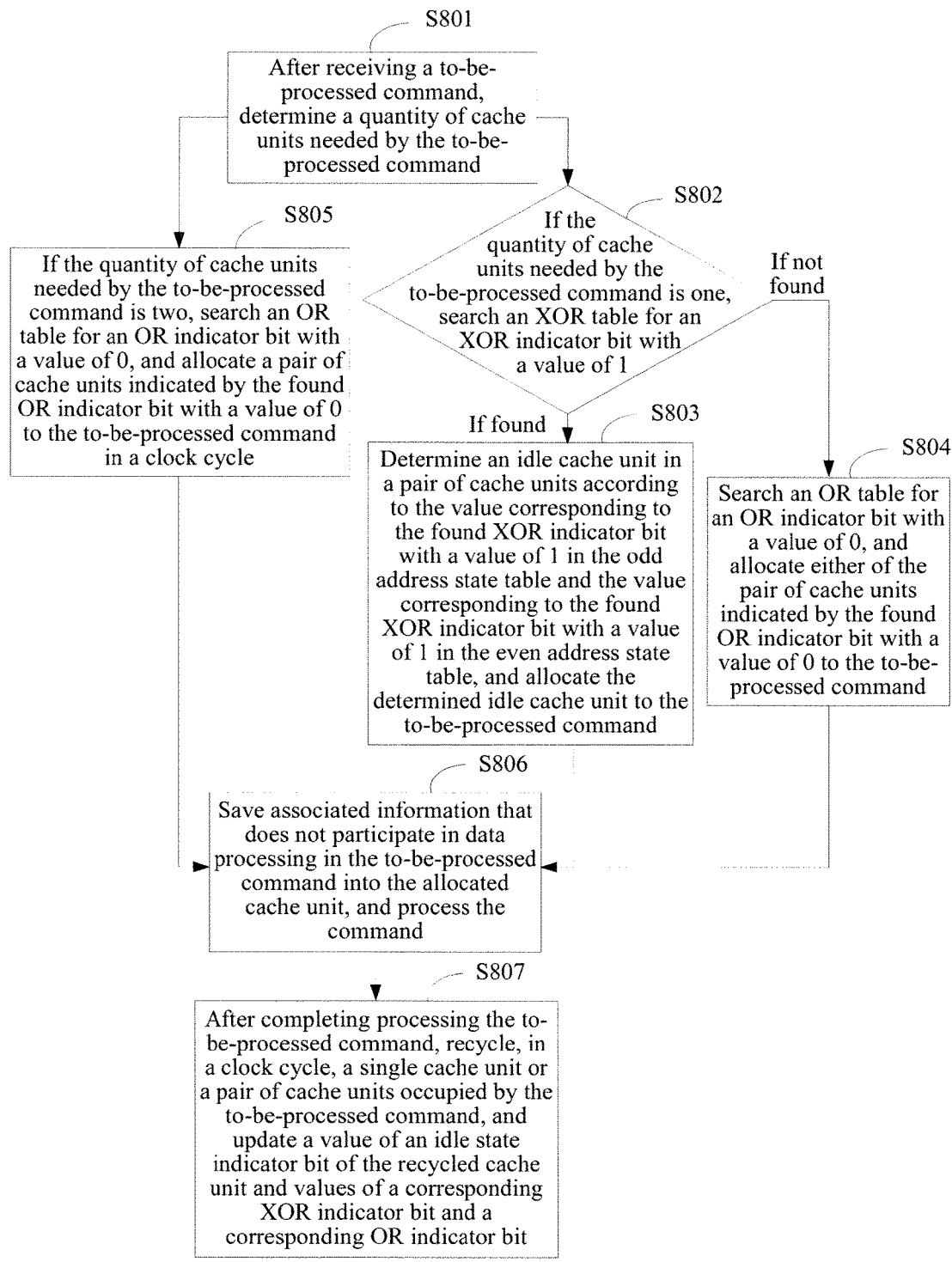
FIG. 8 is a flowchart of a cache management method according to Embodiment 3 of this application.

As shown in FIG. 8, Embodiment 3 of this application provides a cache management method. In this embodiment, an idle state indicator bit with a value of 0 represents being idle and an idle state indicator bit with a value of 1 represents being occupied. The method includes the following steps.

S801: After receiving a to-be-processed command, determine a quantity of cache units needed by the to-be-processed command.

S802: If the quantity of cache units needed by the to-be-processed command is one, search an XOR table for an XOR indicator bit with a value of 1, and if the XOR indicator bit with a value of 1 is found, go to S803; otherwise, go to S804.

S803: Determine an idle cache unit in a pair of cache units according to the value corresponding to the found XOR indicator bit with a value of 1 in the odd address state table and the value corresponding to the found XOR indicator bit with a value of 1 in the even address state table, and allocate the determined idle cache unit to the to-be-processed command.

Figure 9A:
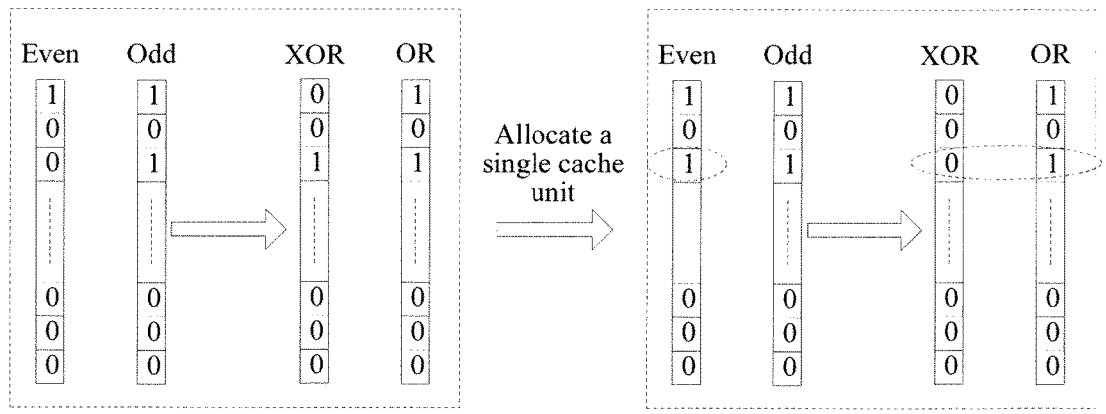
FIG. 9(a) is a schematic diagram of allocating a single idle cache unit according to Embodiment 3.

As shown in FIG. 9(a), an even address cache unit in a third pair of cache units from a start address of a shared cache is allocated to the to-be-processed command, the value of the corresponding XOR indicator bit is updated to 0, and a value of a corresponding OR indicator bit is still 1.

S804: Search an OR table for an OR indicator bit with a value of 0, and allocate either of the pair of cache units indicated by the found OR indicator bit with a value of 0 to the to-be-processed command.

Figure 9B:
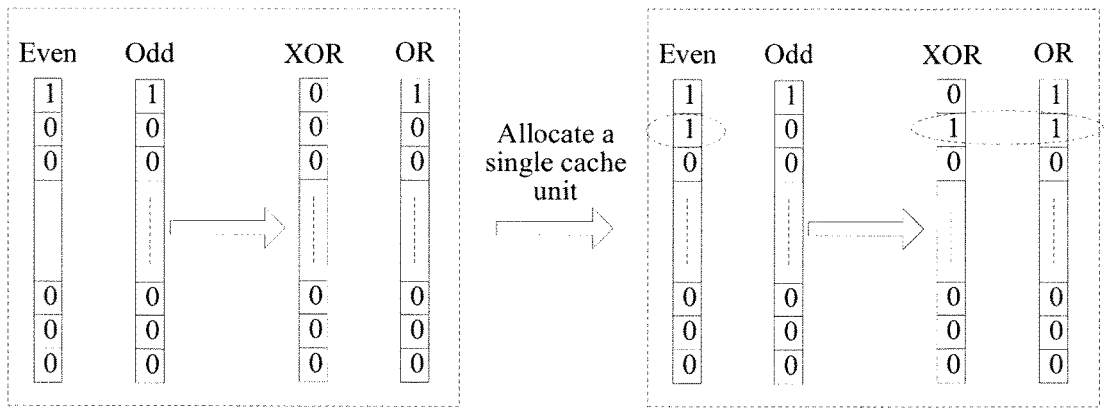
FIG. 9(b) is another schematic diagram of allocating a single idle cache unit according to Embodiment 3.

As shown in FIG. 9(b), an even address cache unit in a second pair of idle cache units from the start address of the shared cache is allocated to the to-be-processed command, the value of the corresponding XOR indicator bit is updated to 1, and the value of the corresponding OR indicator bit is updated to 1.

S805: If the quantity of cache units needed by the to-be-processed command is two, search an OR table for an OR indicator bit with a value of 0, and allocate a pair of cache units indicated by the found OR indicator bit with a value of 0 to the to-be-processed command in a clock cycle.

Figure 10:
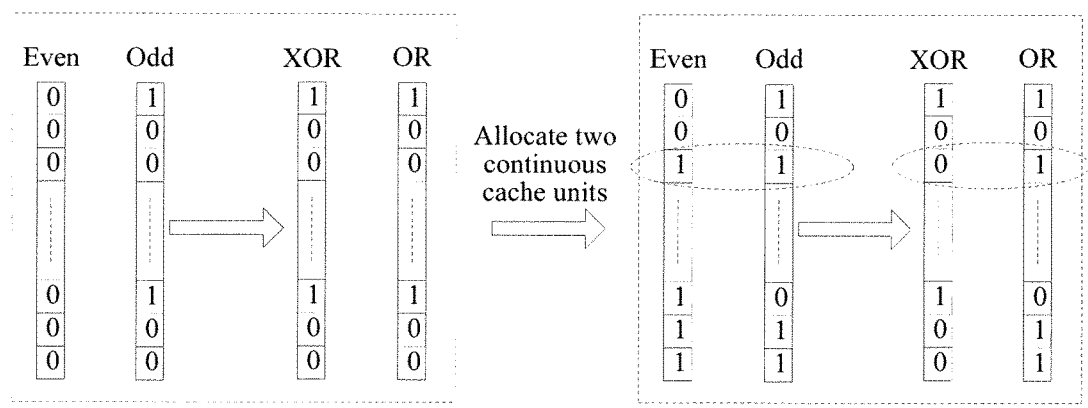
FIG. 10 is a schematic diagram of allocating two continuous idle cache units according to Embodiment 3.

As shown in FIG. 10, two continuous idle cache units indicated by a third pair of odd and even cache units from the start address of the shared cache are directly allocated to the to-be-processed command, the value of the corresponding OR indicator bit is updated to 1, and the value of the corresponding XOR indicator bit is still 0.

S806: Save associated data that does not participate in data processing in the to-be-processed command into the allocated cache unit, and process the command.

S807: After completing processing the to-be-processed command, recycle, in a clock cycle, a single cache unit or a pair of cache units occupied by the to-be-processed command, and update a value of an idle state indicator bit of the recycled cache unit and values of a corresponding XOR indicator bit and a corresponding OR indicator bit.

Here, if the cache unit previously allocated to the to-be-processed command is a single cache unit, the single cache unit is recycled during recycling. If the cache units previously allocated to the to-be-processed command are two continuous cache units, the two continuous cache units are recycled once during recycling, and the value of the idle state indicator bit of the corresponding recycled cache unit in a bitmap is set to 0.

Figure 11:
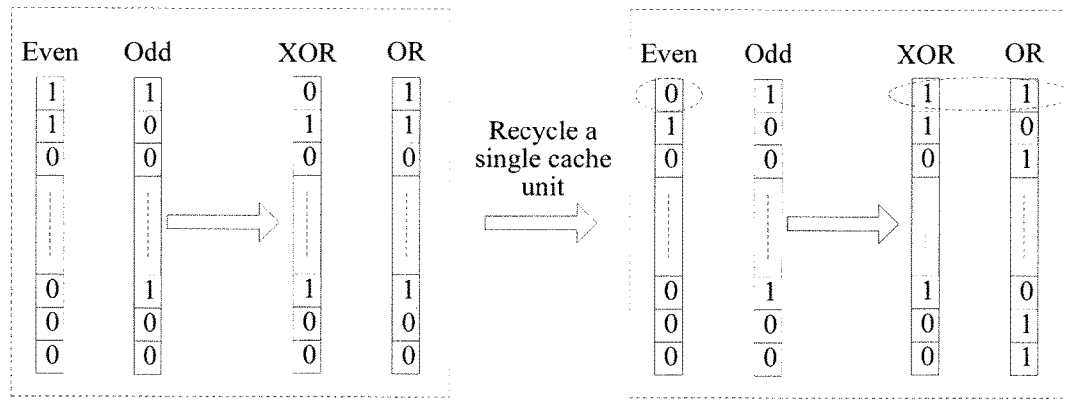
FIG. 11 is a schematic diagram of recycling a single idle cache unit according to Embodiment 3.

As shown in FIG. 11, a first cache unit of the shared cache is recycled. A value of an idle state indicator bit corresponding to the cache unit in the bitmap is set to 0, a value of a corresponding XOR indicator bit is set to 1, and a value of a corresponding OR indicator bit is unchanged.

Figure 12:
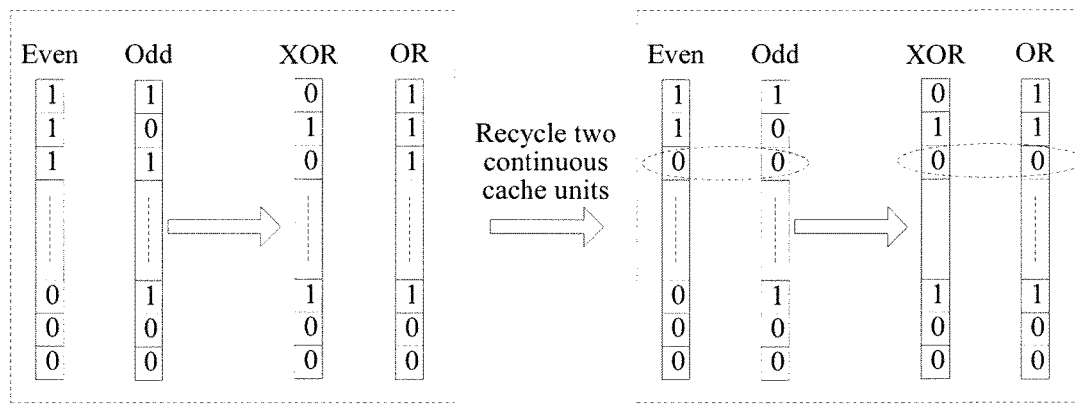
FIG. 12 is a schematic diagram of recycling two continuous cache units according to Embodiment 3.

As shown in FIG. 12, a third pair of cache units of the shared cache are recycled. A value of an idle state indicator bit corresponding to the pair of cache units in the bitmap is set to 0, a value of a corresponding OR indicator bit is set to 0, and a value of a corresponding XOR indicator bit is still 0.

Based on a same inventive concept, an embodiment of this application further provides a cache management apparatus corresponding to the cache management method. Because a principle for the apparatus to resolve a problem is similar to that of the cache management method of the embodiments of this application, refer to the implementation of the method for implementation of the apparatus. Repeated content is not described herein again.

Figure 13:
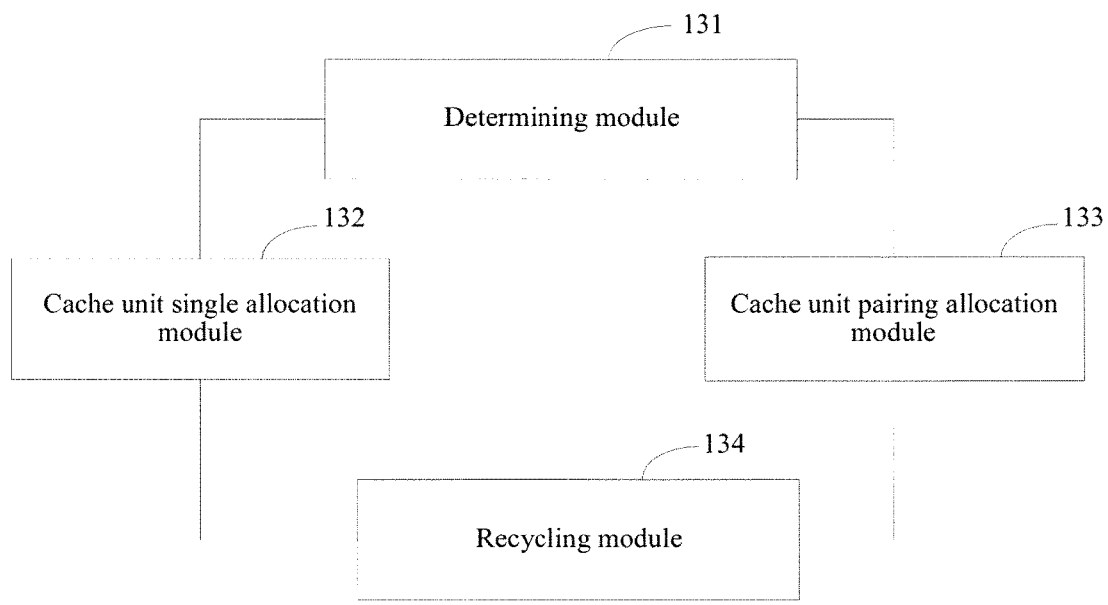
FIG. 13 is a schematic structural diagram of a cache management apparatus according to an embodiment of this application.

As shown in FIG. 13, the cache management apparatus provided in this embodiment of this application is applied to a shared cache management system and includes a determining module 131, a cache unit single allocation module 132, and a cache unit pairing allocation module 133, where the shared cache management system has N cache units with continuous addresses, the shared cache management system maintains a cache unit pair first state table and a cache unit pair second state table, and the shared cache management system divides the N continuous cache units into pairs in order, where the cache unit pair first state table is used to indicate whether only one cache unit in each pair of cache units is idle, and the cache unit pair second state table is used to indicate whether two cache units in each pair of cache units are both idle;

the determining module 131 is configured to: after receiving a to-be-processed command, determine a quantity of cache units needed by the to-be-processed command; and if the quantity of cache units needed by the to-be-processed command is one, instruct the cache unit single allocation module 132 to perform cache allocation, and if the quantity of cache units needed by the to-be-processed command is two, instruct the cache unit pairing allocation module 133 to perform cache allocation;

the cache unit single allocation module 132 is configured to: search for, based on the cache unit pair first state table, a pair of cache units in which only one cache unit is idle, and allocate the idle cache unit in the pair of cache units to the to-be-processed command; and the cache unit pairing allocation module 133 is configured to: search for and allocate, based on the cache unit pair second state table in a clock cycle, a pair of cache units in which two cache units are both idle to the to-be-processed command.

The shared cache management system may further maintain an odd address state table and an even address state table, where the odd address state table is used to indicate an idle state of a cache unit with an odd address, and the even address state table is used to indicate an idle state of a cache unit with an even address.

Optionally, the cache unit single allocation module 132 is further configured to:

if the quantity of cache units needed by the to-be-processed command is one, and the cache unit single allocation module does not find a pair of cache units in which only one cache unit is idle, search for, by means of the cache unit pairing allocation module, a pair of cache units in which two cache units are both idle, and allocate either of the pair of cache units to the to-be-processed command.

Optionally, the cache unit pair second state table is an AND table, and the AND table is a value obtained by performing an AND operation on a value corresponding to each pair of cache units in the odd address state table and a value corresponding to each pair of cache units in the even address state table; in the odd address state table and the even address state table, an idle state indicator bit with a value of 1 represents being idle, and an idle state indicator bit with a value of 0 represents being occupied.

The cache unit pairing allocation module 133 is specifically configured to:

search the AND table for an AND indicator bit with a value of 1, and determine that a pair of cache units indicated by the found AND indicator bit with a value of 1 are the found pair of cache units.

Optionally, the cache unit pair second state table is an OR table, and the OR table is a value obtained by performing an OR operation on a value corresponding to each pair of cache units in the odd address state table and a value corresponding to each pair of cache units in the even address state table; in the odd address state table and the even address state table, an idle state indicator bit with a value of 1 represents being occupied, and an idle state indicator bit with a value of 0 represents being idle.

The cache unit pairing allocation module 133 is specifically configured to:

search the OR table for an OR indicator bit with a value of 0, and if the OR indicator bit with a value of 0 is found, determine that a pair of cache units indicated by the found OR indicator bit with a value of 0 are the found pair of cache units.

Optionally, the cache unit pair first state table is an exclusive OR XOR table, where the XOR table is a value obtained by performing an XOR operation on a value corresponding to each pair of cache units in the odd address state table and a value corresponding to each pair of cache units in the even address state table.

The cache unit single allocation module 132 is specifically configured to:

search the XOR table for an XOR indicator bit with a value of 1; if the XOR indicator bit with a value of 1 is found, determine that a pair of cache units indicated by the found XOR indicator bit with a value of 1 are the found pair of cache units; and determine an idle cache unit in the pair of cache units according to the value corresponding to the found XOR indicator bit with a value of 1 in the odd address state table and the value corresponding to the found XOR indicator bit with a value of 1 in the even address state table, and allocate the determined idle cache unit to the to-be-processed command.

Optionally, if the quantity of cache units needed by the to-be-processed command is two, the apparatus further includes:

a recycling module 134, configured to: after completing processing the to-be-processed command, recycle, in a clock cycle, the pair of cache units allocated to the to-be-processed command.

Optionally, the recycling module 134 is further configured to: after recycling the pair of cache units in a clock cycle, determine, according to other bits except last bits in cache addresses corresponding to the pair of cache units, indicator bits corresponding to the pair of cache units in the odd address state table and the even address state table, and update values of the determined indicator bits in the odd address state table and the even address state table.

Figure 14:
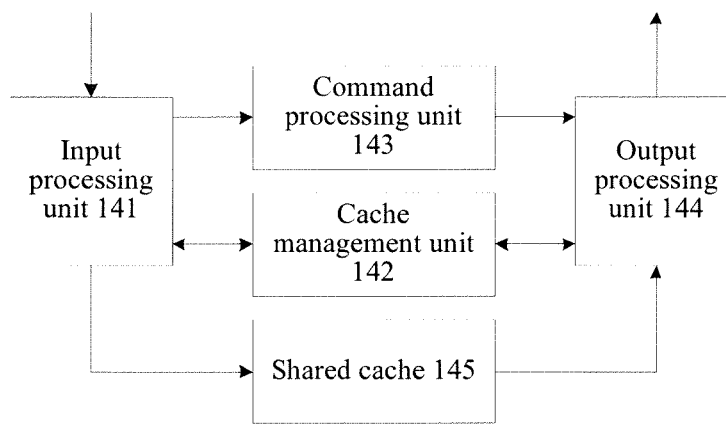
FIG. 14 is a design principle diagram of a command processing apparatus in a chip according to an embodiment of this application.

As shown in FIG. 14, FIG. 14 is a structural diagram of a command processing apparatus in a chip according to an embodiment of this application, including an input processing unit 141, a cache management unit 142, a command processing unit 143, an output processing unit 144, and a multithread sharing shared cache 145, and the shared cache 145 is generally a Static Random Access Memory (SRAM).

The shared cache 145 has N cache units with continuous addresses, the cache management unit 142 maintains a cache unit pair first state table and a cache unit pair second state table, and the cache management unit 142 divides the N continuous cache units into pairs in order, where the cache unit pair first state table is used to indicate whether only one cache unit in each pair of cache units is idle, and the cache unit pair second state table is used to indicate whether two cache units in each pair of cache units are both idle.

The input processing unit 141 is configured to: after receiving a to-be-processed command, parse the to-be-processed command, determine a quantity of cache units that need to be applied for, and send a cache application to the cache management unit 142; and according to addresses of cache units allocated by the cache management unit 142, save associated data (such as a thread ID) that does not participate in data processing in the to-be-processed command into the shared cache 145, and send the addresses of the allocated cache units to the command processing unit 143.

The cache management unit 142 is configured to: if the quantity of the cache units applied for by the input processing unit 141 is one, search for, based on the cache unit pair first state table, a pair of cache units in which only one cache unit is idle, and transmit the idle cache unit in the pair of cache units to the input processing unit 141; and if the quantity of cache units needed by the to-be-processed command is two, search for, based on the cache unit pair second state table, a pair of cache units in which two cache units are both idle for the to-be-processed command, and transmit the pair of cache units to the input processing unit 141 in a clock cycle; and after receiving cache addresses of two continuous cache units transmitted by the output processing unit 144, recycle the cache addresses in a clock cycle.

The command processing unit 143 is configured to process the command (such as addition, subtraction, multiplication, or division; in a command processing process, the associated data is always kept in the cache unit), and transmit a processing result and a cache address to the output processing unit 144 after completing processing.

The output processing unit 144 is configured to read the associated data in the shared cache 145 according to the cache address transmitted by the command processing unit 143, output the associated data together with the processing result, and meanwhile, transmit the cache address to the cache management unit 142 for cache recycling.

Optionally, if the quantity of cache units needed by the to-be-processed command is one, and the cache management unit 142 does not find, based on the cache unit pair first state table, a pair of cache units in which only one cache unit is idle, the cache management unit 142 is further configured to: search for, based on the cache unit pair second state table, a pair of cache units in which two cache units are both idle, and allocate either of the pair of cache units to the to-be-processed command.

The cache management unit may further maintain an odd address state table and an even address state table, where the odd address state table is used to indicate an idle state of a cache unit with an odd address, and the even address state table is used to indicate an idle state of a cache unit with an even address.

Optionally, the cache unit pair second state table is an AND table, where the AND table is a value obtained by performing an AND operation on a value corresponding to each pair of cache units in the odd address state table and a value corresponding to each pair of cache units in the even address state table; in the odd address state table and the even address state table, an idle state indicator bit with a value of 1 represents being idle, and an idle state indicator bit with a value of 0 represents being occupied; the cache management unit 142 is specifically configured to search for, according to the following steps, a pair of cache units in which two cache units are both idle: searching the AND table for an AND indicator bit with a value of 1, and determining that a pair of cache units indicated by the found AND indicator bit with a value of 1 are the found pair of cache units in which two cache units are both idle.

Optionally, the cache unit pair second state table is an OR table, where the OR table is a value obtained by performing an OR operation on a value corresponding to each pair of cache units in the odd address state table and a value corresponding to each pair of cache units in the even address state table; in the odd address state table and the even address state table, an idle state indicator bit with a value of 1 represents being occupied, and an idle state indicator bit with a value of 0 represents being idle; the cache management unit 142 is specifically configured to search for, according to the following steps, a pair of cache units in which two cache units are both idle: searching the OR table for an OR indicator bit with a value of 0, and if the OR indicator bit with a value of 0 is found, determining that a pair of cache units indicated by the found OR indicator bit with a value of 0 are the found pair of cache units in which two cache units are both idle.

Optionally, the cache unit pair first state table is an exclusive OR XOR table, where the XOR table is a value obtained by performing an XOR operation on a value corresponding to each pair of cache units in the odd address state table and a value corresponding to each pair of cache units in the even address state table; the cache management unit 142 is specifically configured to: search the XOR table for an XOR indicator bit with a value of 1; and if the XOR indicator bit with a value of 1 is found, determine that a pair of cache units indicated by the found XOR indicator bit with a value of 1 are the found pair of cache units in which only one cache unit is idle; and determine an idle cache unit in the pair of cache units according to the value corresponding to the found XOR indicator bit with a value of 1 in the odd address state table and the value corresponding to the found XOR indicator bit with a value of 1 in the even address state table, and allocate the determined idle cache unit to the to-be-processed command;

Optionally, if the quantity of cache units needed by the to-be-processed command is two, after the command processing unit 143 completes processing the to-be-processed command, the pair of allocated cache units are recycled in a clock cycle.

Optionally, the cache management unit 142 is further configured to: after recycling the pair of cache units in a clock cycle, determine, according to other bits except last bits in cache addresses corresponding to the pair of cache units, indicator bits corresponding to the pair of cache units in the odd address state table and the even address state table, and update values of the determined indicator bits in the odd address state table and the even address state table.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be saved in a computer readable memory that can instruct the computer or any other programmable data processing device to work in a specific manner, so that the instructions saved in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A buffer management method, applied to a shared buffer management system, wherein the shared buffer management system has N buffer units with continuous addresses, the shared buffer management system maintains a buffer unit pair first state table and a buffer unit pair second state table, and the shared buffer management system divides the N continuous buffer units into pairs in order, wherein the buffer unit pair first state table is used to indicate whether only one buffer unit in each pair of buffer units is idle, and the buffer unit pair second state table is used to indicate whether two buffer units in each pair of buffer units are both idle, the method comprising:
  after receiving a to-be-processed command, determining a quantity of buffer units needed by the to-be-processed command;
  if the quantity of buffer units needed by the to-be-processed command is one, searching for, based on the buffer unit pair first state table, a pair of buffer units in which only one buffer unit is idle, and allocating the idle buffer unit in the pair of buffer units to the to-be-processed command; and
  if the quantity of buffer units needed by the to-be-processed command is two, searching for and allocating, based on the buffer unit pair second state table in a clock cycle, a pair of buffer units in which two buffer units are both idle to the to-be-processed command.

2. The method according to claim 1, wherein if the quantity of buffer units needed by the to-be-processed command is one, and a pair of buffer units in which only one buffer unit is idle are not found based on the buffer unit pair first state table, the method further comprises:
  searching for, based on the buffer unit pair second state table, a pair of buffer units in which two buffer units are both idle, and allocating either of the pair of buffer units to the to-be-processed command.

3. The method according to claim 1, wherein the shared buffer management system further maintains an odd address state table and an even address state table, wherein the odd address state table is used to indicate an idle state of a buffer unit with an odd address, and the even address state table is used to indicate an idle state of a buffer unit with an even address;
  the buffer unit pair first state table is an exclusive OR (XOR) table, wherein the XOR table is a value obtained by performing an XOR operation on a value corresponding to each pair of buffer units in the odd address state table and a value corresponding to each pair of buffer units in the even address state table; the searching for, based on the buffer unit pair first state table, a pair of buffer units in which only one buffer unit is idle comprises: searching the XOR table for an XOR indicator bit with a value of 1; and if the XOR indicator bit with a value of 1 is found, determining that a pair of buffer units indicated by the found XOR indicator bit with a value of 1 are the found pair of buffer units in which only one buffer unit is idle; and
  the allocating the idle buffer unit in the found pair of buffer units to the to-be-processed command comprises:
  determining an idle buffer unit in the pair of buffer units according to the value corresponding to the found XOR indicator bit with a value of 1 in the odd address state table and the value corresponding to the found XOR indicator bit with a value of 1 in the even address state table, and allocating the determined idle buffer unit to the to-be-processed command;
  the buffer unit pair second state table is an AND table, wherein the AND table is a value obtained by performing an AND operation on a value corresponding to each pair of buffer units in the odd address state table and a value corresponding to each pair of buffer units in the even address state table; in the odd address state table and the even address state table, an idle state indicator bit with a value of 1 represents being idle, and an idle state indicator bit with a value of 0 represents being occupied; the searching for, based on the buffer unit pair second state table, a pair of buffer units in which two buffer units are both idle comprises: searching the AND table for an AND indicator bit with a value of 1, and determining that a pair of buffer units indicated by the found AND indicator bit with a value of 1 are the found pair of buffer units; or
  the buffer unit pair second state table is an OR table, wherein the OR table is a value obtained by performing an OR operation on a value corresponding to each pair of buffer units in the odd address state table and a value corresponding to each pair of buffer units in the even address state table; in the odd address state table and the even address state table, an idle state indicator bit with a value of 1 represents being occupied, and an idle state indicator bit with a value of 0 represents being idle; the searching for, based on the buffer unit pair second state table, a pair of buffer units in which two buffer units are both idle comprises: searching the OR table for an OR indicator bit with a value of 0, and if the OR indicator bit with a value of 0 is found, determining that a pair of buffer units indicated by the found OR indicator bit with a value of 0 are the found pair of buffer units.

4. The method according to claim 1, after the if the quantity of buffer units needed by the to-be-processed command is two, allocating a pair of buffer units to the to-be-processed command, further comprising:
  after completing processing the to-be-processed command, recycling the pair of buffer units in a clock cycle.

5. The method according to claim 4, after the recycling the pair of buffer units in a clock cycle, further comprising:
  determining, according to other bits except last bits in buffer addresses corresponding to the pair of buffer units, indicator bits corresponding to the pair of buffer units in an odd address state table and an even address state table, and updating values of the determined indicator bits in the odd address state table and the even address state table.

6. A buffer management apparatus, wherein the apparatus is applied to a shared buffer management system and comprises:
a memory; and
a processor, coupled to the memory,
the processor includes a determining module, a buffer unit single allocation module and a buffer unit pairing allocation module, wherein
the shared buffer management system has N buffer units with continuous addresses, the shared buffer management system maintains a buffer unit pair first state table and a buffer unit pair second state table, and the shared buffer management system divides the N continuous buffer units into pairs in order, wherein the buffer unit pair first state table is used to indicate whether only one buffer unit in each pair of buffer units is idle, and the buffer unit pair second state table is used to indicate whether two buffer units in each pair of buffer units are both idle;
the determining module is configured to: after receiving a to-be-processed command, determine a quantity of buffer units needed by the to-be-processed command; and if the quantity of buffer units needed by the to-be-processed command is one, instruct the buffer unit single allocation module to perform buffer allocation, and if the quantity of buffer units needed by the to-be-processed command is two, instruct the buffer unit pairing allocation module to perform buffer allocation;
the buffer unit single allocation module is configured to: search for, based on the buffer unit pair first state table, a pair of buffer units in which only one buffer unit is idle, and allocate the idle buffer unit in the pair of buffer units to the to-be-processed command; and
the buffer unit pairing allocation module is configured to: search for and allocate, based on the buffer unit pair second state table in a clock cycle, a pair of buffer units in which two buffer units are both idle to the to-be-processed command.

7. The apparatus according to claim 6, wherein the buffer unit single allocation module is further configured to:
if the quantity of buffer units needed by the to-be-processed command is one, and the buffer unit single allocation module does not find a pair of buffer units in which only one buffer unit is idle, search for, by means of the buffer unit pairing allocation module, a pair of buffer units in which two buffer units are both idle, and allocate either of the pair of buffer units to the to-be-processed command.

8. The apparatus according to claim 6, wherein the shared buffer management system further maintains an odd address state table and an even address state table, wherein the odd address state table is used to indicate an idle state of a buffer unit with an odd address, and the even address state table is used to indicate an idle state of a buffer unit with an even address;
the buffer unit pair first state table is an exclusive OR (XOR) table, wherein the XOR table is a value obtained by performing an XOR operation on a value corresponding to each pair of buffer units in the odd address state table and a value corresponding to each pair of buffer units in the even address state table; the buffer unit single allocation module is specifically configured to: search the XOR table for an XOR indicator bit with a value of 1; and if the XOR indicator bit with a value of 1 is found, determine that a pair of buffer units indicated by the found XOR indicator bit with a value of 1 are the found pair of buffer units in which only one buffer unit is idle; and determine an idle buffer unit in the pair of buffer units according to the value corresponding to the found XOR indicator bit with a value of 1 in the odd address state table and the value corresponding to the found XOR indicator bit with a value of 1 in the even address state table, and allocate the determined idle buffer unit to the to-be-processed command;
the buffer unit pair second state table is an AND table, wherein the AND table is a value obtained by performing an AND operation on a value corresponding to each pair of buffer units in the odd address state table and a value corresponding to each pair of buffer units in the even address state table; in the odd address state table and the even address state table, an idle state indicator bit with a value of 1 represents being idle, and an idle state indicator bit with a value of 0 represents being occupied; the buffer unit pairing allocation module is specifically configured to: search the AND table for an AND indicator bit with a value of 1, and determine that a pair of buffer units indicated by the found AND indicator bit with a value of 1 are the found pair of buffer units in which two buffer units are both idle; or
the buffer unit pair second state table is an OR table, wherein the OR table is a value obtained by performing an OR operation on a value corresponding to each pair of buffer units in the odd address state table and a value corresponding to each pair of buffer units in the even address state table; in the odd address state table and the even address state table, an idle state indicator bit with a value of 1 represents being occupied, and an idle state indicator bit with a value of 0 represents being idle; the buffer unit pairing allocation module is specifically configured to: search the OR table for an OR indicator bit with a value of 0, and if the OR indicator bit with a value of 0 is found, determine that a pair of buffer units indicated by the found OR indicator bit with a value of 0 are the found pair of buffer units in which two buffer units are both idle.

9. The apparatus according to claim 6, wherein if the quantity of buffer units needed by the to-be-processed command is two, the apparatus further comprises:
a recycling module, configured to: after completing processing the to-be-processed command, recycle, in a clock cycle, the pair of buffer units allocated to the to-be-processed command.

10. The apparatus according to claim 9, wherein the recycling module is further configured to: after recycling the pair of buffer units in a clock cycle, determine, according to other bits except last bits in buffer addresses corresponding to the pair of buffer units, indicator bits corresponding to the pair of buffer units in an odd address state table and an even address state table, and update values of the determined indicator bits in the odd address state table and the even address state table.

11. A shared buffer management system, wherein the shared buffer management system comprises:
a buffer management apparatus and N buffer units with continuous addresses, wherein the shared buffer management system further maintains a buffer unit pair first state table and a buffer unit pair second state table, and the shared buffer management system divides the N continuous buffer units into pairs in order, wherein the buffer unit pair first state table is used to indicate whether only one buffer unit in each pair of buffer units is idle, and the buffer unit pair second state table is used to indicate whether two buffer units in each pair of buffer units are both idle;

the buffer management apparatus comprises:
  a memory; and
  a processor, coupled to the memory,
    the processor includes a determining module, a buffer unit single allocation module and a buffer unit pairing allocation module, wherein:

the determining module is configured to: after receiving a to-be-processed command, determine a quantity of buffer units needed by the to-be-processed command; and if the quantity of buffer units needed by the to-be-processed command is one, instruct the buffer unit single allocation module to perform buffer allocation, and if the quantity of buffer units needed by the to-be-processed command is two, instruct the buffer unit pairing allocation module to perform buffer allocation;

the buffer unit single allocation module is configured to: search for, based on the buffer unit pair first state table, a pair of buffer units in which only one buffer unit is idle, and allocate the idle buffer unit in the pair of buffer units to the to-be-processed command; and the buffer unit pairing allocation module is configured to: search for and allocate, based on the buffer unit pair second state table in a clock cycle, a pair of buffer units in which two buffer units are both idle to the to-be-processed command.

\* \* \* \* \*